US010173358B2

(12) United States Patent
Toullec et al.

(10) Patent No.: US 10,173,358 B2
(45) Date of Patent: Jan. 8, 2019

(54) PROCESS FOR MAKING A CROSS-LINKED POLYETHYLENE ARTICLE

(71) Applicant: BOREALIS AG, Vienna (AT)

(72) Inventors: Thierry Toullec, Lyons (FR); Paul Laurenson, Tence (FR); Bart Verheule, Schelle (BE); Ola Fagrell, Stenungsund (SE); Linus Karlsson, Gothenburg (SE)

(73) Assignee: BOREALIS AG, Vienna (AT)

( * ) Notice: Subject to any disclaimer, the term of this patent is extended or adjusted under 35 U.S.C. 154(b) by 525 days.

(21) Appl. No.: 14/649,939

(22) PCT Filed: Dec. 17, 2013

(86) PCT No.: PCT/EP2013/003817
§ 371 (c)(1),
(2) Date: Jun. 5, 2015

(87) PCT Pub. No.: WO2014/095044
PCT Pub. Date: Jun. 26, 2014

(65) Prior Publication Data
US 2015/0314509 A1 Nov. 5, 2015

(30) Foreign Application Priority Data
Dec. 21, 2012 (EP) .................... 12008541

(51) Int. Cl.
| B29L 7/00 | (2006.01) |
| B29L 9/00 | (2006.01) |
| C08F 8/42 | (2006.01) |
| C08J 5/00 | (2006.01) |
| C08K 5/00 | (2006.01) |
| C08K 5/57 | (2006.01) |
| H01B 3/44 | (2006.01) |
| B29C 47/00 | (2006.01) |
| B29C 47/02 | (2006.01) |
| B29C 47/88 | (2006.01) |
| B29C 47/92 | (2006.01) |
| B29K 83/00 | (2006.01) |
| B29L 23/00 | (2006.01) |
| C08L 43/04 | (2006.01) |

(52) U.S. Cl.
CPC ...... *B29C 47/0004* (2013.01); *B29C 47/0009* (2013.01); *B29C 47/0014* (2013.01); *B29C 47/0016* (2013.01); *B29C 47/0021* (2013.01); *B29C 47/0023* (2013.01); *B29C 47/02* (2013.01); *B29C 47/88* (2013.01); *B29C 47/8895* (2013.01); *B29C 47/92* (2013.01); *C08F 8/42* (2013.01); *C08J 5/00* (2013.01); *C08K 5/0091* (2013.01); *C08K 5/57* (2013.01); *H01B 3/441* (2013.01); *B29K 2083/00* (2013.01); *B29K 2995/0058* (2013.01); *B29L 2007/00* (2013.01); *B29L 2009/00* (2013.01); *B29L 2023/22* (2013.01); *C08F 2810/20* (2013.01); *C08J 2343/04* (2013.01); *C08K 5/0025* (2013.01)

(58) Field of Classification Search
CPC ....... B29C 47/00; B29C 47/02; B29C 47/004; B29C 47/009; B29C 47/0014; B29C 47/0016; B29C 47/0023; B29C 47/88; B29C 47/8895; B29C 47/92
USPC ........ 264/176.1, 209.1, 211, 211.12, 211.13, 264/211.14, 211.2
See application file for complete search history.

(56) References Cited

U.S. PATENT DOCUMENTS

| 3,646,155 A | 2/1972 | Scott | |
| 4,117,195 A | 9/1978 | Swarbrick et al. | |
| 4,446,283 A * | 5/1984 | Doi | .......... C08F 10/00 525/326.5 |
| 4,857,250 A * | 8/1989 | Gale | ..................... B29C 47/365 264/171.19 |

FOREIGN PATENT DOCUMENTS

| EP | 0 193 317 A2 | 9/1986 |
| WO | WO 2005/003199 A1 | 1/2005 |
| WO | WO 2010/130457 A1 * | 11/2010 |
| WO | WO 2011/160964 A1 * | 12/2011 |

OTHER PUBLICATIONS

Voigt, W., "Increased Scorch Resistance of Medium Voltage Power Cable Insulation by the Use of Liquid Antioxidants," 50th International Wire & Cable Symposium, Nov. 2001, Florida, USA, 8 pages. (Year: 2001).*
International Search Report dated Jan. 24, 2014 for International application No. PCT/EP2013/003817.
Written Opinion dated Jan. 24, 2014 for International application No. PCT/EP2013/003817.

* cited by examiner

*Primary Examiner* — William P Fletcher, III
(74) *Attorney, Agent, or Firm* — Fay Sharpe LLP

(57) ABSTRACT

A process for for making a cross-linked polyethylene article includes: (A) feeding a blend comprising a cross-linkable silane-group containing polyethylene copolymer and at least one additive to an extruder, (B) feeding a liquid comprising a silanol condensation catalyst to said extruder to form a mixture with said blend, (C) extruding said mixture to form an article and (D) cross-linking said article. The article may be a pipe or cable.

20 Claims, No Drawings

PROCESS FOR MAKING A CROSS-LINKED POLYETHYLENE ARTICLE

The present invention relates to a process for making a cross-linked polyethylene article and to the use thereof in the production of cables, pipes or films.

A typical electrical power cable or wire generally comprises one or more conductors in a cable core, which is surrounded by one or more insulation layers or sheaths of polymeric material. The core is typically copper or aluminium but it may also be non-metallic, surrounded by a number of different polymeric layers, each serving a specific function, e.g. a semiconducting shield layer, an insulation layer, a metallic tape shield layer and a polymeric jacket. Each layer can provide more than one function. For example, low voltage wire or cable are often surrounded by a single polymeric layer that serves as both an insulating layer and an outer jacket, while medium to extra-high voltage wire and cable are often surrounded by at least separate insulating and jacket layers.

The insulating layer and the semiconducting layers normally consist of a polymer composition comprising a cross-linked polyolefin. Cross-linking substantially contributes to improve properties of the polymer such as its mechanical strength, chemical, abrasion and heat resistance.

Cross-linking can be brought about by adding free-radical-forming agents, such as peroxides, to the polymer composition prior to or during extrusion of the cable. It is also known to crosslink polyolefins, such as polyethylene, by introducing cross-linkable groups, such as hydrolysable silane groups, in the polymer. Therefore a class of materials often used for cables insulating or semiconductor layers are silane-cross-linkable copolymer compositions.

There are three major technologies currently employed for the productions of such materials: the Monosil process (U.S. Pat. No. 3,646,155), the EVS process (EP193317) and the Sioplas process (U.S. Pat. No. 4,117,195).

In the Monosil process, silane groups are grafted onto the polyethylene polymer chain with peroxide in a cable extruder. Peroxide, silane, additives and cross-linking catalyst are typically directly pumped into the extruder or mixed just prior to being fed to the extruder. In the extruder, the peroxide decomposes into radicals, which start the grafting of the silane groups onto the polymer chain. The final product is a homogeneous one-phase composition wherein the catalyst and the additives are uniformly distributed in the silane grafted polymer.

The process has, however, several disadvantages: it implies a reactive compounding in combination with cable extrusion and the system is a balance of all components and can easily be disturbed. Due to the reactive compounding, scorch is inherently formed, meaning that production campaigns can only be short and regular cleaning of the extruder is necessary. The polymer is crosslinked in the extruder and cleaning is very hard. Short stops will also plug the extruder with crosslinked polymer and tool changing will require a complete cleaning of the cable extruder.

The Monosil process is therefore complex, has high scrap level (3-4%) during start up and tool changes, short production campaign, long stops for cleaning, reduced production rates. Further, the liquid blend of peroxide, silane, additives and cross-linking catalyst is normally costly as it is prepared in advance to optimize the grafting reaction and at the same time reduce the undesirable cross-linking reactions that might occur already in the extruder. Generally a dryer to pre-dry the polyethylene polymer is required prior to the extruder for an optimal set up.

In the EVS technology the addition of silanes to the polymer chain is made in a high pressure reactor. A master batch of a polyolefin, additives, silanol condensation catalyst is added and dry-mixed to the preformed polyethylene pellets just before entering a cable extruder. In the extruder the mixture is melted together to form a two phases final composition. One phase includes the additives and the catalyst and the other phase the silane polymer.

The master batch, wherein the catalyst and optionally further additives are contained in a polymer, e.g. a polyolefin matrix in concentrated form, is typically in pellets form. The matrix polymer is generally a polyolefin, e.g. low density polyethylene, or polyethylene-methyl-, -ethyl, or -butyl-acrylate copolymer and mixtures thereof.

The drawback of the EVS process is that master batches are adding complexity due to an extra compounding step. Further a lower degree of homogeneity is achieved because of the two phases. The master batch has a high loading of additives, such as condensation catalyst, lubricant, drying agent and antioxidant. This causes problems with exudation to the pellets surface of additives which will effect storage stability, processability and melt homogenization.

In the Sioplas process, silane groups are grafted onto the polyethylene polymer chain with peroxide in a mixer or an extruder. A master batch of additives, silanol condensation catalyst is added and dry-mixed to the preformed polymer just before entering a cable extruder. In this second extruder the mixture is melted together to form a two phases final composition. Hence, the Sioplas process implies a reactive extrusion as well as the use of a master batch, resulting in a complex process, requiring many processing steps. Also in this case, a dryer to pre-dry the polyethylene polymer and the master batch prior to the mixer or extruder is required for an optimal set up.

In the above described processes also other types of master batches could in addition be added, for example, colour master batches, flame retardant master batches, UV-master batches or other additive master batches.

The present invention provided a simple, cost efficient process of producing high quality silane polyethylene cross-linked articles. According to the process a liquid comprising a silanol condensation catalyst is added to a preformed, stable cross-linkable silane-group containing polyethylene copolymer.

The process of the invention has no reactive extrusion, which is the major weakness of the Monosil processes, does not require a master batch offering a great simplification and improved homogeneity with respect to the EVS and Sioplas processes. The need for pre-drying of catalyst master batches is eliminated.

A further advantage of the invention is that it allows easy distribution of the silanol condensation catalyst into the silane-group containing polyethylene copolymer. There is no need as for the EVS and Sioplas processes that the silane-group containing polyethylene copolymer and the master batch are melted and blended homogenously together, or to use very long extruders as in the Monosil process.

In particular, in the Monosil process, wherein the silane and peroxide generally soak into the polymer pellets, especially long extruders for the distribution of additives, melt homogenisation and grafting reaction are required. A homogenous grafted compound is only obtained for extruder having a length/diameter ratio (L/D) typically as high as 30 or higher. The L/D value is a measurement of the mixing power of extruders.

In the Sioplas process the silane groups are grafted onto polyethylene. The master batch is dry blended, molten into a 2 phase system, melt mixed and homogenized in the cable extruder. In this process L/D typically is 20 or higher.

The process of the invention allows the use of regular extruders and the re-utilization of existing extruders employed in other technologies to produce the polyethylene composition according to the process of the invention. In particular, the extruder in the process of the invention may have L/D of 16 or higher.

One further advantage of the invention is that there is no carrier for the master batch in the final composition. The carrier has no silane groups and will add typically 5 wt % of non cross-linkable polymer, meaning that 5 wt % of the polymer will never crosslink.

Hence, the present invention provides a process for making a cross-linked polyethylene article comprising:
(A) feeding a blend comprising a cross-linkable silane-group containing polyethylene copolymer and at least one additive to an extruder,
(B) feeding a liquid comprising a silanol condensation catalyst to said extruder to form a mixture with said blend,
(C) extruding said mixture to form the article, and
(D) cross-linking said article.

As used herewith the term "blend" means a mixture or combination of at least two components wherein each component may be in any form such as, for example, pellet, powder or liquid.

As used herewith the term "liquid" means an incompressible fluid in the extruder, i.e. liquid at 100° C., or preferably at 50° C. or most preferably at room temperature (23° C.).

According to one embodiment, the blend and the liquid are separately fed to the extruder.

According to another embodiment, the blend and the liquid are premixed before entering the extruder.

Preferably, the process is peroxide free.

More preferably, the at least one additive is an antioxidant or a scorch retarder, preferably a silane containing scorch retarder.

Even more preferably, the blend comprises all the additives of the composition to be formed, except for the silanol condensation catalyst and optionally the drying agent. Then, the liquid preferably consists of the silanol condensation catalyst and optionally the drying agent.

According to a preferred embodiment, the liquid comprises a silanol condensation catalyst and a drying agent, preferably it consist of a silanol condensation catalyst and a drying agent.

According to a further preferred embodiment, the blend comprises and preferably consists of a cross-linkable silane-group containing polyethylene copolymer, an antioxidant and a scorch retarder; and the liquid comprises, preferably consists of a silanol condensation catalyst and a drying agent.

According to particularly preferred embodiments, the cross-linkable silane-group containing polyethylene copolymer is a copolymer of ethylene and a tri-alkoxy vinyl silane or vinyl tri-methoxy silane.

The silane-group containing polyethylene copolymer can be either grafted or reactor made. The cross-linkable silane-group containing polyethylene copolymer is preferably formed in a high pressure reactor.

The silanol condensation catalyst may be either an acid or a base. Preferably, the silanol condensation catalyst is a Lewis or Brønsted acid, such as sulphonic acid and more preferably, the silanol condensation catalyst is metal containing Lewis acid, even more preferably, the silanol condensation catalyst is dioctyl tin laureate (DOTL) or dibutyltindilaureate (DBTL) or zirconium acetylacetonate.

In and another embodiment of the invention, the condensation catalyst is a sulphonic acid, preferably, dodecyl benzyl sulphonic acid (DBSA). If a sulphonic acid is used, it is preferably water free. This can for example be achieved by a drying agent, preferably, a silane containing drying agent or by making an anhydride of the acid.

The invention also relates to the use of the process of the inventions in the production of cables, pipes, or films, preferably cables.

The process of the invention comprises feeding a blend comprising a cross-linkable silane-group containing polyethylene copolymer and at least one additive to an extruder.

The cross-linkable silane-group containing polyethylene in the blend is a copolymer derived from ethylene or essentially from ethylene and an ethylenically unsaturated silane group containing comonomer units. The term "essentially" means that the copolymer can be derived from up to 30 wt % of copolymerizable monomers other than ethylene and the ethylenically unsaturated silane group containing comonomer units. Examples of such optional monomers include α-olefins such as propylene, hexane-1 and 4-methylpentene-1; vinyl esters such as vinyl acetate and vinyl butyrate; unsaturated organic acid derivatives such as methyl acrylate and methyl methacrylate; unsaturated aromatic monomers such as styrene and a-methylstyrene; and vinyl ethers such as vinylmethyl ether and vinylphenyl ether. These optional monomers can be present in the ethylene copolymer in any form, e.g. a graft form, a random form or a block form.

Preferably the silane group containing comonomer units is represented by the formula:

$$R^1SiR^2_qY_{3-q} \quad (I)$$

Wherein $R^1$ is an ethylenically unsaturated hydrocarbyl, hydrocarbyloxy or (meth)acryloxy hydrocarbyl group, $R^2$ is an aliphatic saturated hydrocarbyl group, Y which may be the same or different, is a hydrolysable organic group and q is 0, 1 or 2.

Examples of the silane group containing comonomer units are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred silane group containing comonomer unit is represented by the formula:

$$CH_2=CHSi(OA)_3 \quad (II)$$

wherein A is a hydrocarbyl group having 1-8 carbon atoms, preferably 1-4 carbon atoms.

The most preferred silane groups containing comonomer units are vinyl tri-methoxysilane, vinyl bis-methoxyethoxysilane, vinyl tri-ethoxysilane, gamma-(meth)acryl-oxypropyltri-methoxysilane, gamma(meth)acryloxypropyltriethoxysilane, and vinyl tri-acetoxysilane.

The cross-linkable silane-group containing polyethylene copolymer may be prepared according to any known methods, such as high pressure radical polymerization or grafting. Preferably the copolymer is formed in a high pressure reactor.

The ethylene and the unsaturated silane group containing comonomer units are copolymerized under any conditions such that copolymerization of the two monomers occurs. Preferably, those monomers are copolymerized under a pressure of 500 to 4.000 kg/cm², preferably 1.000 to 4.000 kg/cm², and at a temperature of 100 to 400° C., preferably 150 to 350° C., in the presence of a radical polymerization initiator, optionally together with up to about 30 wt % of a comonomer and a chain transfer agent(s).

The monomers are normally compressed in several stages up to the desired pressure before introduction into the reactor. Usually, the polymerisation is carried out continuously in either an autoclave or a tubular reactor. Monomer conversion is generally higher in a tubular reactor than in an autoclave. Besides, by polymerisation in a tubular reactor ethylene (co)polymers with a branching structure well-suited for cross-linking thereof can be provided. Tubular reactors are either single-feed or multi-feed reactors, including split-feed reactors. In a single-feed tubular reactor (also referred to as front-feed reactor), the total monomer flow is fed to the inlet of the first reaction zone. In a multi-feed tubular reactor, the monomers are fed into the reactor at several locations along the reactor. In a split-feed reactor, the compressed monomer mixture are split into several streams and fed into the reactor at different locations thereof.

Reaction is started by injection of the radical initiator. The reaction mixture cools after the first reaction peak and additional initiator is added to start a second reaction zone. The number of initiator injection points determines the number of reaction zones. A tubular reactor for production of ethylene (co)polymers by high pressure radical polymerisation usually comprises a total of two to five reaction zones.

Further details of the production of ethylene (co)polymers by high pressure radical polymerisation can be found in the Encyclopedia of Polymer Science and Engineering, Vol. 6 (1986), pp 383-410.

In the copolymerization of the polyethylene and the unsaturated silane group containing comonomer units, any radical polymerization initiators, comonomers and chain transfer agents, which are conventionally used in homopolymerization of ethylene or copolymerization of ethylene with other monomers can be used.

Examples of radical polymerization initiators include (a) organic peroxides such as lauroyl peroxide, dipropionyl peroxide, benzoyl peroxide, di-t-butyl peroxide, t-butyl hydroperoxide, and t-butyl peroxyisobutyrate; (b) molecular oxygen; and (c) azo compounds such as azobisisobutyronitrile and azoisobutylvalero-nitrile.

Examples of the chain transfer agent include (a) paraffinic hydrocarbons such as methane, ethane, propane, butane and pentane; (b) a-olefins such as propylene, butene-1 and hexene-1; (c) aldehydes such as formaldehyde, acetaldehyde and n-butylaldehyde; (d) ketones such as acetone, methyl ethyl ketone and cyclohexanone; (e) aromatic hydrocarbons; and (f) chlorinated hydrocarbons.

The cross-linkable silane-group containing polyethylene copolymer used in the process of the present invention contains 0.1 to 5 wt %, preferably 0.3 to 3 wt %, and more preferably 0.5 to 2 wt % of the unsaturated silane group containing comonomer units.

The blend comprising the cross-linkable silane-group containing polyethylene copolymer further comprises at least one additive.

Conventional polymer additives are for example, antioxidants, stabilizers e.g. water tree retardants, drying agents, scorch retarders, lubricants, colouring agents and foaming agents. The total amount of additives in the blend may range from 0.3 to 10 wt. %, preferably 1 to 7 wt. %, more preferably 1 to 5 wt. %. In addition, 10 to 70 wt % of filler(s) may be added to the system. Typical fillers are flame retardants like aluminium tri-hydrate and similar or semi-conducting fillers like carbon black. Other common fillers include chalk, talc and mica.

Preferably the at least one additive of the blend is an antioxidant or a scorch retarder.

Preferably an antioxidant comprises a sterically hindered phenol group or aliphatic sulphur groups. Such compounds are disclosed in EP 1 254 923 as particularly suitable antioxidants for stabilisation of polyolefin containing hydrolysable silane groups. Other preferred antioxidants are disclosed in WO2005/003199. Preferably, the antioxidant is present in the blend in an amount of from 0.01 to 3 wt %, more preferably 0.05 to 2 wt %, and most preferably 0.08 to 1.5 wt %.

Preferably the scorch retarder is a silane containing scorch retarder. More preferably the scorch retarder is represented by formula (III):

$$(R^3)_x[Si(R^4)_w(R^5)_z]_m \quad\quad (III)$$

Wherein $R^3$, which may be the same or different if more than one such group is present, is a monofunctional, or, if m=2, is a bifunctional, hydrocarbyl residue comprising from 1 to 100 carbon atoms; $R^4$, which may be the same or different if more than one such group is present, is a hydrocarbyloxy residue comprising from 1 to 100 carbon atoms; $R^5$, is $-R^6SiR^3_pRR^4_n$, wherein p is 0 to 3, preferably 0 to 2, n is 0 to 3, preferably 1 to 3, with the proviso that p+n is 3, and $R^6$ is $-(CH2)_rL_s(CH2)_t-$ where r and t independently are 1 to 3, s is 0 or 1 and L is a difunctional heteroatomic group selected from $-O-$, $-S-$, $-SO-$, $-SO2-$, $-NH-$, $-NR^3-$ or $-PR^3-$, where $R^3$ and $R^4$ are as previously defined; and x is 0 to 3, w is 1 to 4, z is 0 or 1, with the proviso that x+w+z=4; and m=1 or 2.

Preferably, in formula (III), $R^4$, which may be the same or different if more than one such group is present, is an alkoxy, aryloxy, alkylaryloxy, or arylalkyloxy group containing 1 to 15 carbon atoms, with the proviso that if more than one $R^4$ group is present the total number of carbon atoms in the alkyl moieties of the $R^4$ groups is at most 40. More preferably, $R^4$, which may be the same or different if more than one such group is present, is a linear or branched C1- to C10-alkoxy, still more preferably is a C1- to C8-alkoxy, still more preferably is a C1- to C4-alkoxy, and most preferably is a methoxy, ethoxy, propoxy, or 1-butoxy group. The alkyl moieties of $R^3$ and $R^4$ may be linear or branched. $R^3$ and $R^4$ may comprise heteroatom substituents, however, preferably, $R^3$ and $R^4$ are free of any heteroatom substituents. Preferably, in formula (III) x=1. Furthermore, preferably in formula (III) w=3. Still further, preferably in formula (III) z=0. Finally, preferably in formula (III) m=1.

In a particularly preferred embodiment, the scorch retarder comprises, more preferably consists of, hexadecyl tri-methoxy silane.

Preferably the scorch retarder is included in the blend. The scorch retarder is preferably present in the blend in an amount between 0.05 wt % and 5 wt %, more preferably between 0.2 wt % and 1 wt %.

A drying agent reduces free water. Preferably, the drying agent is a silane containing drying agent. More preferably, the drying agent is vinyl tri-methoxy silane (VTMS) or vinyl tri-ethoxy silane (VTES). Most preferably the drying agent is VTES. Another preferred drying agent is an anhydride. Although, the drying agent may be included in the blend it is preferably comprised in the liquid comprising the silanol condensation catalyst.

The drying agent may also be added together with the blend and the liquid in a pre-mixer prior to the extruder or pumped separately into the extruder. The drying agent is present in the liquid comprising the silanol condensation catalyst in an amount large enough to keep the silanol condensation catalyst free from water. The drying agent is typically, present in the mixture (blend and liquid) in an amount of from 0.001 to 1 wt %, more preferably 0.005 to 0.5 wt %, and most preferably 0.01 to 0.25 wt %.

According to a preferred embodiment, the blend comprises all the additives of the composition to be formed, except for the silanol condensation catalyst.

According to another preferred embodiment, the blend comprises and preferably consists of a cross-linkable silane-group containing polyethylene copolymer, an antioxidant and a scorch retarder.

The blend of the cross-linkable silane-group containing polyethylene copolymer and the at least one additive is formed before been fed to the extruder wherein the liquid is added.

Preferably, the at least one additive is added to the cross-linkable silane-group containing polyethylene copolymer melt in a blending apparatus. Preferably the blend is converted into pellets.

According to the process of the invention the blend comprising the cross-linkable silane-group containing polyethylene copolymer and at least one additive is fed in an extruder. In order to later be able to crosslink the blend, a liquid comprising a silanol condensation catalyst is fed to said extruder to form a mixture with said blend.

According to one embodiment, the blend and the liquid are separately fed to the extruder. According to another embodiment, the blend and the liquid are premixed before entering the extruder.

The extruder may be any extruder employed in the art. However, preferably the extruder has a L/D of 16 or higher. According to the process of the invention, the cross-linkable silane-group containing polyethylene copolymer and at least one additive is preferably soaked with the liquid comprising the condensation catalyst in the extruder. A smaller amount of liquids is added in comparison to the Monosil process. This allows using extruders having L/D of 16 or higher.

According to an embodiment of the invention the extruder of the process has L/D lower than 20, preferably equal to 18 or lower than 18.

The silanol condensation catalyst used in the liquid of the present invention is generally selected from the compounds which can be conventionally used as a catalyst for accelerating dehydration condensation between silanol groups.

The silanol condensation catalyst may be either an acid or a base. Preferably, the silanol condensation catalyst is a Lewis or Brønsted acid, such as sulphonic acid and more preferably the silanol condensation catalyst is metal containing Lewis acid, more preferably the silanol condensation catalyst is dioctyl tin laureate (DOTL) or dibutyltindilaureate (DBTL) or zirconium acetylacetonate or dodecyl benzyl sulphonic acid (DBSA).

Most preferably the silanol condensation catalyst is dioctyl tin laureate (DOTL) or dodecyl benzyl sulphonic acid (DBSA).

The liquid to be fed to the extruder may further comprise additional ingredients such as, for example, antioxidants and other conventional polymer additives such as stabilizers e.g. water tree retardants, drying agents, scorch retardants, lubricants, colouring agents and foaming agents, as defined above. The liquid is preferably peroxide free.

According to a preferred embodiment the liquid consists of a silanol condensation catalyst.

According to another preferred embodiment, the liquid comprises a silanol condensation catalyst and a drying agent, preferably it consist of a silanol condensation catalyst and a drying agent.

The preferred amount of silanol condensation catalyst is from 0.0001 to 6 wt %, more preferably 0.001 to 2 weight % and most preferably 0.02 to 0.5 wt % of the mixture of the blend and the liquid. The effective amount of catalyst depends on the molecular weight of the catalyst used. Thus, a smaller amount is required of a catalyst having a low molecular weight than of a catalyst having a high molecular weight.

The mixture of the blend and the liquid are then extruded to form an article, preferably a cable, a pipe or a film, preferably a cable.

Cables may be communication cables or more preferably electrical or power cables. The compositions can be extruded about a wire or cable to form an insulating or jacketing layer or can be used as bedding compounds. According to a preferred embodiment the cable is a low voltage cable, preferably below 1000 V. Usually, the cable is produced by co-extrusion of the different layers onto the conducting core.

Then, the article is cross-linked, preferably by moisture curing, wherein the silane groups are hydrolyzed under the influence of water or steam. Moisture curing is preferably performed in a sauna or water bath at temperatures of 70 to 100° C. or at ambient conditions.

Test Methods

Unless otherwise stated in the description or claims, the following methods were used to measure the properties defined generally above and in the claims and in the examples below. The samples were prepared according to given standards, unless otherwise stated.

(a) Melt Flow Rate

The melt flow rate (MFR) is determined according to ISO 1133. The MFR is measured with a load of 21.6 Kg at 190° C. and/or with a load of 2.16 Kg at 130° C.

(b) Density

The density of the polymer is measured according to ISO 1183/D.

(c) Hot Set Elongation

Tape preparation: the mixtures are extruded at 190° C. Then, cross-linking is performed in a water bath at temperatures of 90° C. for 24 hours. After, the samples are placed in a constant room set up at 24° C. and 50% humidity for 24 h. Then tapes of desired length are cut out.

The above described tapes are used to determine the hot set properties. Three dumb-bells samples, taken out along extrusion direction are prepared according to ISO527 5A from the 1.8+/−0.1 mm thick crosslinked tape. The hot set tests are made according to EN60811-2-1 (hot set test) by measuring the thermal deformation.

Reference lines are marked 20 mm apart on the dumb-bells. Each test sample is fixed vertically from upper end thereof in the oven and the load of 0.2 MPa is attached to the lower end of each test sample. After 15 min, 200° C. in oven the distance between the pre-marked lines is measured and the percentage hot set elongation calculated, elongation %. For permanent set %, the tensile force (weight) is removed from the test samples and after, recovered in 200° C. for 5 minutes and then let to cool at room temperature.

The permanent set % reported in Table 3 is calculated from the distance between the marked lines. The average of the three tests is reported.

(d) Tape's Surface Analysis

Tapes are visually inspected when stable extruding conditions are reached, typically after 20 min. To simulate time for tool changes, the extruder is then stopped and after 5 min stop tapes are visually inspected. The extruder is then started again and after 30 min stop tapes are visually inspected. Number of gels per cm$^2$ and estimated diameter are measured.

(e) Easiness of Cleaning

Easiness of cleaning is based on the perception of a person skilled in the art after opening the extruder compared to routinely made cleaning of extruding conventional LDPE.

(f) Content (Mol-%) of Hydrolysable Silane Group(s) Using X-Ray Fluorescence Analysis:

The pellet sample is pressed to a 3 mm thick plaque (150° C. for 2 minutes, under pressure of 5 bar and cooled to room temperature). Si-atom content is analysed by wavelength dispersive XRF (AXS S4 Pioneer Sequential X-ray Spectrometer supplied by Bruker).

Generally, in XRF-method, the sample is irradiated by electromagnetic waves with wavelengths 0.01-10 nm. The elements present in the sample emit fluorescent X-ray radiations with discrete energies that are characteristic for each element. By measuring the intensities of the emitted energies, quantitative analysis can be performed. The quantitative methods are calibrated with compounds with known concentrations of the element of interest e.g. prepared in a Brabender compounder.

The XRF results show the total content (wt %) of Si and are then calculated as wt % of cross-linkable silicon-containing groups, e.g. $R^1SiR^2_qY_{3-q}$.

EXAMPLES

The present invention will now be described in more detail by reference to the following inventive examples and reference examples.

Inventive Examples 1 to 6

The polymer compositions of the inventive examples are summarized in Table 1.

The blend used in all the examples is a pelletized reactor made ethylene vinyl silane copolymer (EVS) and includes vinyl tri-methoxy silane (VTMS) as additive. The blend contains 1.3 wt % VTMS, has a melt index of 1.0 g/10 min, and density of 0.923 g/cm$^3$.

As silanol condensation catalyst, dioctyl tin-laurate (DOTL) is used in example 1 to 5. In examples 1 to 4 the liquid consists of the sole catalyst, whereas in example 5, the liquid consists of the catalyst and vinyl tri-methoxy silane (VTMS). In example 6, dodecyl benzyl sulphonic acid (DBSA) is used as silanol condensation catalyst and the liquid further includes VTMS.

The EVS blend and the liquid are preheated at 60° C. Then, the liquid is added over the EVS pellets followed by intensive dry blending in order to distribute the catalyst all over the pellets surface. Immediately after the mixing of the blend and the liquid, under humidity controlled conditions, the material is added to the extruder and tapes 0.2 mm thick are extruded at 190° C. A normal extruder screw is used (compression ratio 1:3.6).

Then, crosslinking is performed in a water bath at temperatures of 90° C. for 24 hours. After, the samples are placed in a constant room set up at 24° C. and 50% humidity for 24 h. Then samples of desired length are cut out.

TABLE 1

| Component | Ex1 | Ex2 | Ex3 | Ex4 | Ex5 | Ex6 |
|---|---|---|---|---|---|---|
| Blend | 99.92 wt % EVS-VTMS | 99.88 wt % EVS-VTMS | 99.825 wt % EVS-VTMS | 99.90 wt % EVS-VTMS | 99.89 wt % EVS-VTMS | 99.89 wt % EVS-VTMS |
| Liquid | 0.08 wt % DOTL | 0.12 wt % DOTL | 0.175 wt % DOTL | 0.10 wt % DOTL | 0.11 wt % 9DOTL/1VTMS | 0.11 wt % 9DBSA/1VTMS |

Reference Examples 1 to 4

The polymer compositions of the reference examples are summarized in Table 2.

In Reference examples 1 and 2, the same blend as in the inventive example is used.

Instead of a liquid comprising a catalyst, a master batch is used and added to the EVS polymer. The master batches used contain either 0.175 wt % DOTL or 0.075 wt % DBSA as silanol condensation catalyst. The master batch further contains ethylene-butyl acrylate-copolymer produced in a high-pressure tubular process having a butyl acrylate content of 17 wt %, an MFR$_2$ (ISO 1133, 190° C., 2.16 kg) of 7.0 g/10 min and a density of 924 kg/m$^3$.

In reference 3 and 4 a linear low-density polyethylene (LLDPE), having melt index of 2.8 g/10 min and density of 0.918 g/cm$^3$ is used.

A liquid mixture of VTMS, dicumylperoxide (DCP), and DBTL is added to the LLDPE and e reactive extrusion is performed. The used mixture is Dynasylan Silfin 06 from Evonik.

TABLE 2

| Component | Ref. 1 | Ref. 2 | Ref. 3 | Ref. 4 |
|---|---|---|---|---|
| Blend | 95 wt % EVS-VTMS | 95 wt % EVS-VTMS | | |
| Master batch | 5 wt % DOTL-MB | 5 wt % DBSA-MB | | |
| Olefin | | | 99 wt % LLPDE | 98.4 wt % LLPDE |
| Liquid blend | | | 1 wt % DCP-VTMS-DBTL | 1.6 wt % DCP-VTMS-DBTL |

All the mixtures are extruded at 190° C. Then, crosslinking is performed in a water bath at temperatures of 90° C. for 24 hours. After, the samples are placed in a constant room set up at 24° C. and 50% humidity for 24 h. Then samples of desired length are cut out.

The results of the tests performed on the cross-linked tapes are reported in Table 3 and compared to the results obtained for the inventive examples.

All the inventive examples feature a hot set elongation value below 100, making the articles of the invention suitable for cable applications.

All the analyzed samples, inventive examples and references, feature a surface quality which is acceptable for cable applications. The best combination of hot set elongation and tape surface quality are obtained for Ex6.

In conclusion, with the simplified process of the present invention, cross-linked polyethylene articles suitable for cable applications are obtained.

TABLE 3

| Test | Ex3 | Ex4 | Ex5 | Ex 6 | Ref. 1 | Ref. 2 | Ref. 3 | Ref. 4 |
|---|---|---|---|---|---|---|---|---|
| Hot set | 34 | 72.9 | 71.5 | 37 | 30 | 26 | 157.2 | 35.8 |
| Tape surface quality (stable conditions) | rough | smooth | very smooth | very smooth | very smooth | very smooth | rough | very rough |
| No and size of gels/ cm² | 10-15 ~1 mm | 10-15 <0.1 mm | 5 <0.1 mm | | | | 10-15 ~1 mm | 10-15 ~1 mm |
| Tape surface quality after 5 min stop | | | smooth, some small gels | smooth, some small gels | | | rough, many large gels | very rough, many large gels |
| Tape surface quality after 30 min stop | | | rough, many small gels, some uneven edges | smooth, some small gels | | | very rough, many large gels | |
| Easy of cleaning | | Neutral | Easy | Easy | | | Hard | Very hard |

The invention claimed is:

1. A process for making a cross-linked polyethylene article comprising:
   (A) feeding a blend comprising a cross-linkable silane-group containing polyethylene copolymer and at least one additive to an extruder,
   (B) feeding a liquid comprising a silanol condensation catalyst to said extruder to form a mixture with said blend,
   (C) extruding said mixture to form the article and
   (D) cross-linking said article.

2. The process according to claim 1 wherein the blend and the liquid are separately fed to the extruder.

3. The process according to claim 1 wherein the blend and the liquid are premixed before entering the extruder.

4. The process according to claim 1 wherein the at least one additive is an antioxidant.

5. The process according to claim 1 wherein the at least one additive is a scorch retarder.

6. The process according to claim 5 wherein the scorch retarder is a silane-containing compound.

7. The process according to claim 6 wherein the cross-linkable silane-group containing polyethylene copolymer is a copolymer of ethylene and a tri-alkoxy vinyl silane or vinyl tri-methoxy silane.

8. The process according to claim 1 wherein the cross-linkable silane-group containing polyethylene copolymer is formed in a reactor under a pressure of 500 to 4,000 kg/cm².

9. The process according to claim 1 wherein the silanol condensation catalyst comprises a metal and a Lewis acid.

10. The process according to claim 1 wherein the silanol condensation catalyst is dioctyl tin laureate (DOTL) or zirconium acetylacetonate.

11. The process according to claim 1 which is peroxide free.

12. The process according to claim 1 wherein the article is a cable and the extruder is a cable extruder.

13. The process according to claim 1 wherein the blend comprises all the additives of the composition to be formed, except for the silanol condensation catalyst and optionally a drying agent.

14. The process according to claim 1 wherein the liquid consist of the silanol condensation catalyst or the silanol condensation catalyst and a drying agent.

15. The process according to claim 1 further comprising: forming the blend prior to the feeding.

16. The process according to claim 1, wherein the blend is in the form of pellets.

17. The process according to claim 1, wherein the blend is in the form of a powder.

18. The process according to claim 1, wherein the blend is in the form of a second liquid.

19. The process according to claim 1, wherein the liquid consists of dioctyl tin laurate.

20. A process for making a cross-linked polyethylene article comprising:
   (A) feeding a blend comprising a cross-linkable silane-group containing polyethylene copolymer and at least one additive to an extruder,
   (B) feeding a liquid comprising a silanol condensation catalyst to said extruder to form a mixture with said blend,
   (C) extruding said mixture to form the article and
   (D) cross-linking said article;
   wherein the blend is in the form of pellets comprising an ethylene vinyl silane copolymer and vinyl trimethoxy silane.

* * * * *